United States Patent [19]

Borst et al.

[11] 4,105,539
[45] Aug. 8, 1978

[54] DEWAXING WITH A POLYMERIZED POLYOL ESTER DEWAXING AID

[75] Inventors: Hans Borst, Oosterbeek, Netherlands; Reginald David Owen Evans; John Arthur Rand, both of Bromborough, England

[73] Assignee: Internationale Octrooi Maatschappij "Octropa" B.V., Netherlands

[21] Appl. No.: 742,606

[22] Filed: Nov. 17, 1976

[30] Foreign Application Priority Data

Nov. 18, 1975 [GB] United Kingdom ............... 47477/75

[51] Int. Cl.² .................... C10G 43/06; C10G 43/08
[52] U.S. Cl. ...................................... 208/33; 208/38; 252/182

[58] Field of Search ................ 208/33, 37, 38; 44/66, 44/70; 252/56 R

[56] References Cited

U.S. PATENT DOCUMENTS

| | | | |
|---|---|---|---|
| 2,100,915 | 11/1937 | Pevere .................................... | 208/38 |
| 2,153,895 | 4/1939 | McKittrick et al. ................... | 208/38 |
| 2,161,581 | 6/1939 | Knowles ................................ | 208/37 |

*Primary Examiner*—Herbert Levine
*Attorney, Agent, or Firm*—Barry Kramer

[57] ABSTRACT

A process for de-waxing oil comprises dissolving a polymerized polyol ester blend in a waxy oil, optionally with a solvent or diluent and cooling to crystallize out the wax using acids in the $C_8$ to $C_{24}$ range to form the esters.

9 Claims, No Drawings

DEWAXING WITH A POLYMERIZED POLYOL ESTER DEWAXING AID

This invention relates to the separation of wax from mineral (petroleum) oils and is particularly concerned with the process in which an additive is incorporated in the system to enhance separation of wax from the mineral oil.

There has long been a need to separate wax from mineral oils to improve their low temperature properties and also to provide wax as a useful raw material.

Currently used processes for de-waxing mineral oils are based on cooling the wax-containing oil to solidify the wax and separating out the wax from the oil. Various multi-stage processes have been proposed and techniques involving the use of a refrigerant/solvent have been disclosed. The use of other solvents or diluents such as methyl ethyl ketone (mek) or low boiling hydrocarbons has been proposed in conjunction with oil pour point depressants which are said to be useful as de-waxing aids. These pour point depressants are intended to improve the structure of the wax crystals to ensure improved separation of wax from the oil. Such additions are said to improve the yield of de-waxed oil and can reduce the separation stages required to separate out the traces of oil from the wax.

In this specification, when reference is made to the de-waxing of mineral oil, it will be appreciated that similar techniques can well be used to remove traces of oil from wax filter cakes and the term de-waxing of mineral oil is intended to cover such processes and likewise the removal of wax from various distillates, residues, bright stocks and similar mineral oil products.

The present invention concerns the use of certain esters as de-waxing aids which are also found to improve the rate of filtration of oils and reduce the oil remaining in the wax residue. In addition, some of the new de-waxing aids are particularly useful in that they are non-toxic and may be left in the wax which can be used, subject to any government hygiene regulations, in contact with foodstuffs and like sensitive materials.

Accordingly, the present invention provides a process for the separation of wax from mineral oil, comprising forming a solution of an effective amount of a blend of polymerised polyol esters in a waxy mineral oil and subsequently cooling the solution to a crystallization temperature to separate out wax and at least some of the ester from the solution, in which process the amount of polymerised polyol ester is sufficient to modify the crystal structure of the separated wax and the polyol esters are of $C_8$ to $C_{24}$ fatty acids containing at least 5 esterified hydroxyl groups per molecule.

Preferably, the process is carried out in the presence of an appropriate solvent or diluent which is added to the solution before the wax is separated out. The addition of a solvent or diluent is well known in this art and tends to speed up the filtration rate and improve the separation of the wax but, as will be shown later, using the process of the present invention an even greater increase in throughput can be obtained.

Preferred polymerised polyols for use in the preparation of the polyol esters used in this invention include various polyglycerols and di- and higher pentaerythritol polymers.

The preferred polyols are polyglycerols.

The actual polymerised polyol ester composition used in any particular waxy mineral oil will depend on the crystallization temperature of the wax in the mineral oil. It is desirable that the polyol ester should tend to come out from solution at a temperature similar to that at which the wax comes out, hence causing a maximum effect on the structure of the wax crystals.

Preferably, the chain length of the fatty acids used is selected to ensure that the polymerized polyol esters come out from the waxy solution at substantially the same temperature as the wax and so modifies its structure. Clearly, if the wax comes out over a range of temperatures, the ester should come out over a similar range, hence it is usual to use a mixture of esters. Generally, it is desirable to have at least 20% by weight of acids in the $C_{20}$ to $C_{24}$ range for carrying out the separation process on normal waxy oils in orthodox apparatus. Preferably, the percentage of polyol esters derived from $C_{20}$ to $C_{24}$ acids to ester derived from $C_8$ to $C_{18}$ acids is in the range 20:80 to 80:20.

This invention also provides a polymerised polyol ester blend suitable for use as a de-waxing additive, comprising the above-mentioned blend of $C_{20}$ to $C_{24}$ and $C_8$ to $C_{18}$ polymerised polyol esters.

In a further preferred form, the invention provides a blend in which the fatty acids are present in 3 ranges: $C_8$ to $C_{14}$: $C_{16}$ to $C_{18}$:$C_{20}$ to $C_{24}$ in weight percent 0–50:-20–80:80–20.

The temperature at which the polymerised polyol esters come out from the solution is also related to the particular polymerised polyol which is esterified and the degree of esterification. Preferably the polymerised polyol has from 6 to 20 OH groups in the molecule.

Suitable solvents or diluents which can be used in the wax separation process are well known in the art and include acetone, methyl ethyl ketone (mek), methyl isobutyl ketone (mibk), petroleum naphtha and toluene.

Preferably the polymerised polyol ester is dissolved in the waxy oil before a solvent, such as mek, is added.

By simple tests, a suitable range of polymerised polyol esters can be determined for various waxes and in preferred forms of this invention, the polyglycerols will be based upon 8 to 14 glycerol residues.

The upper limit on the molecular weight of the polymerised polyol is generally determined by its availability and handle-ability.

The amount of polyol ester added to any particular waxy oil will be related to the wax content of the oil. Generally, the amount of polyol ester added is from 0.3 to 1.5%, preferably of the order of 1% of the wax content of the mineral oil.

When dealing with a waxy oil having a range of waxes present which crystallize out over a fairly wide temperature band, it is desirable that more than one type of polymerised polyol ester is used to improve overall crystallization.

Data concerning some of the polymerized polyol esters used in the experimental work described later is set out in Table I below.

TABLE I

| Sample | Acids | OH value of polyglycerol Initial | Final Ester | Final Acid Value | Setting Point °C |
|---|---|---|---|---|---|
| Ester 1 | 90% Behenic $C_{22}$ | 871 | 6.7 | 15.1 | 66.6 |
| Ester 2 | 65–35% Stearic Palmitic $C_{18}C_{16}$ | 871 | 6.5 | 14.0 | 47.8 |
| Ester 3 | Distilled coconut oil, largely $C_{10}$ and above | 871 | 2.8 | 5.3 | 30 |

The hydroxyl values correspond to the number of glycerol units as follows:

| | OH Value mg.KOH per g sample |
|---|---|
| nonaglycerol | 902 |
| decaglycerol | 888 |
| undecaglycerol | 877 |
| dodecaglycerol | 867 |

De-waxing experiments were carried out on a sample of waxy lubricating oil of viscosity 115 Saybolt Universal seconds at 100° F containing about 20% by weight of wax. Samples of polymerised polyol ester were dissolved in the waxy lubricating oil and a solution of the mixture made in methyl ethyl ketone (1 part by weight of oil and of mek). The solution was cooled in a laboratory scraped-surface crystallizer from about 45° to 10° C in approximately 30 minutes and then further cooled to −6° C in the next 30 minutes. Finally the mixture was held at −6° C for a further period of 60 minutes. At the end of this time the contents of the crystallizer were quantitatively transferred to a filter and filtered at −6° C. The resulting cake was washed with 1 part by weight of mek also at −6° C. The yields of both solid and liquid fractions were obtained by removing the excess solvent by evaporation, firstly on a steam bath and finally in a vacuum oven, at 80°–90° C. The results are set out in Table II below. The yields in Table II and the other examples have been reduced by losses of material during transfer on the small-scale experimental plant. This process constitutes a "light" de-waxing.

TABLE II

| Examples | % Polymerised Polyol Ester by Weight of Wax | Ratio of Ester 2/Ester 1 | Filtration Rate "secs" | | Wash Rate "secs" | | % Yields Solids | % Yields Liquids |
|---|---|---|---|---|---|---|---|---|
| | Nil | — | 40 | 80 | 60 | 90 | 26 | 71 |
| 1 | 2.5 | 50:50 | 30/40 | 60/65 | 30/35 | 45 | 20 | 79 |
| 2 | 1.25 | 50:50 | 25/30 | 45 | 50 | 50 | 18 | 78 |
| 3 | 0.625 | 50:50 | 18 | 40 | 20 | 30/35 | 21 | 75 |
| 4 | 0.95 | 50:50 | 25 | 50 | 25/30 | 40/45 | 19.5 | 76.5 |
| 5 | 0.95 | 50:50 | 23 | 48 | 23 | 35 | 19.5 | 78.5 |
| 6 | 0.95 | 75:25 | 30 | 50/55 | 40 | 55/60 | 23.5 | 72 |
| 7 | 0.95 | 25:75 | 30/35 | 50/55 | 45/50 | 75 | 23.8 | 73 |

Examples 4 and 5 were duplicate runs and indicate the reproducibility of the technique.

The two "time" columns under filtration and wash relate to the two observed stages of drying of the filter cake. The shorter time indicates the initial sight of a dry area around the filter bed and the second, longer time indicates the earliest time at which the filter cake appeared dry.

The above "light" de-waxing indicates the benefits obtainable by selecting appropriate blends of the polymerised polyol esters and the variations available in filtration rate, wash rate and solids yields.

Further experiments were carried out involving a "heavy" de-waxing.

In this experimental work heavy de-waxing is at about −18° C.

Samples of selected polymerised polyol esters were dissolved in a waxy lubricating oil of 115 Saybolt Universal seconds viscosity at 100° F containing about 30% by weight wax and 1:1 mixture made of the hot waxy oil containing the polyol ester with methyl ethyl ketone. As before, the materials were taken through a cooling cycle in a scraped-surface cooler and filtered through a jacketed stainless-steel Buchner-type funnel which had been previously cooled to the same temperature as the crystallizer. Filtration was again measured at the two drying stages and the filter cake washed with a similar quantity of mek at an appropriate temperature.

The results of a single de-waxing stage as a heavy de-waxing carried out at −18° C are set out in Table III below:

TABLE III

| Examples | Polymerised Polyol Ester Composition % by Weight of Wax | Separation Rates (secs) Filter | | Wash | | Yields % by Weight Solid | Liquid | Total | Cloud Point of Liquid |
|---|---|---|---|---|---|---|---|---|---|
| | No polyol ester | 60 | 120 | 60 | 120 | 56.3 | 39.8 | 96.1 | −17° C |
| 8 | 0.32% Ester 2 <br> 0.32% Ester 1 | 20 | 50 | 80 | 100 | 43.8 | 51.8 | 95.6 | −14° C |
| 9 | 0.32% Ester 2 <br> 0.32% Ester 1 <br> 0.33% Ester 4 | 15 | 45 | 135 | 165 | 47.5 | 47.8 | 95.3 | −16° C |
| 10 | 0.32% Ester 2 <br> 0.32% Ester 1 <br> 0.33% Ester 5 | 20 | 60 | 120 | 165 | 43.3 | 52.5 | 95.8 | −18° C |
| 11 | 0.32% Ester 2 <br> 0.32% Ester 1 | 10 | 40 | 15 | 50 | 41.8 | 53.0 | 94.8 | −18° C } Duplicate results |

TABLE III-continued

| Examples | Polymerised Polyol Ester Composition % by Weight of Wax | Separation Rates (secs) Filter | | Wash | | Yields % by Weight Solid | Liquid | Total | Cloud Point of Liquid |
|---|---|---|---|---|---|---|---|---|---|
| | 0.33% Ester 3 | 10 | 40 | 15 | 60 | 40.8 | 52.3 | 93.1 | −18° C |
| 12 | 0.32% Ester 2<br>0.32% Ester 1 | 10 | 55 | 30 | 60 | 37.5 | 55.5 | 93.0 | −18° C } Duplicate results |
| | 0.67% Ester 3 | 10 | 55 | 20 | 75 | 40.3 | 53.0 | 93.3 | −17° C |

Ester 4 is a polyglycerol ester of distilled tallow fatty acids (largely saturated and unsaturated $C_{16-18}$).

figures in brackets indicate previous results from Table III runs.

TABLE IV

| | Polymerised Polyol Ester Composition % by Weight of Wax | Separation Rates (secs) Filter | | Wash | | Yields % by Weight Solid | Liquid | Total | Cloud Point of Liquid |
|---|---|---|---|---|---|---|---|---|---|
| | No polyol ester | 30 | — | 45 | 65 | 46.5<br>(56.3) | 46.8<br>(39.8) | 93.3<br>(96.1) | −13° C<br>(−17° C) |
| Ex. 11 | 0.32% Ester 2<br>0.32% Ester 1<br>0.32% Ester 3 | 10 | 60 | 20 | 50 | 40.9<br>(41.8)<br>(40.8) | 53.5<br>(53.0)<br>(52.3) | 94.4<br>(94.8)<br>(93.1) | −14° C<br>(−18° C)<br>(−18° C) |
| Expt. 1 | 1% Aluminium Stearate | 25 | 70 | 40 | — | 43.5 | 50.8 | 94.3 | −15° C |
| Expt. 2 | 0.33% Aluminium Stearate | 15 | 55 | 25 | 50 | 51.4 | 44.0 | 95.4 | −15° C |

Ester 5 is a polyglycerol ester of hardened tallow, iodine value 35 to 40 (largely $C_{16}$ and $C_{18}$ saturated fatty acids and $C_{18}$ mono-unsaturated fatty acid). It will be noted in Table III that the addition of Ester 3 enhances the yield and rate of separation in the heavy de-waxing stage to a greater extent than other high molecular weight additives.

In Examples 13 to 20 various other polymerised polyester blends are demonstrated and compared with unpolymerised polyol esters using similar acids and other compositions not within the invention. (Materials not within the invention are designated "Experiments".)

The formulation of the various blends and experiments is set out in Table V below:

TABLE V

| | Polymerised Polyol Ester Parts by Weight | | | | | Other Components |
|---|---|---|---|---|---|---|
| Blend | 1 | 2 | 3 | 4 | 5 | Parts by Weight |
| A | 1 | 1 | 1 | | | |
| D | | 1 | 1 | | | 1 di-pentaerythritol hexabehenate |
| E | | 1 | 1 | | | 1 tri-pentaerythritol octabehenate |
| F | | 1 | 1 | | | 1 nona-pentaerythritol eicosabehenate |
| G | | 1 | 1 | | | 1 behenic ester of polyglycerol of OH value 960 (8-OH) |
| H | | 1 | 1 | | | 1 behenic ester of polyglycerol of OH value 900 (11-OH) |
| J | | 1 | 1 | | | 1 of Ester 1 made using 80% $C_{22}$ fatty acid |
| K | | 1 | 1 | | | 1 of Ester 1 made using 70% $C_{22}$ fatty acid |
| L | 1 | 1 | | | | |
| M | 1 | 3 | | | | |
| N | 3 | 1 | | | | |
| P | 1 | 1 | | | 1 | |
| R | 1 | 1 | | 1 | | |
| S | 1 | 1 | 2 | | | |
| Expt. | | | | | | |
| A | | 1 | 1 | | | 1 sorbitol pentabehenate |
| B | | 1 | 1 | | | 1 glycerol tribehenate |
| C | | 1 | 1 | | | 1 pentaerythritol tetrabehenate |

Unless otherwise stated esters prepared from behenic acid are based on acid of 90% purity.

It has previously been proposed to add aluminium stearate to waxy oil to assist in wax removal and the following experiments illustrate the effectiveness of this soap compared with some of the polyol esters of this invention. The same heavy de-waxy technique was used as in Examples 8–12 and the results are set out in Table IV as Experiments 1 and 2 together with a blank with no polyol ester and a repeat run of Example 11. The The formulation of the polymerised polyol esters numbered 1 to 5 is set out earlier in the specification. The "other components" sets out the formulation of the materials used in the various blends and experiments additional to the basic 5 esters. The following notes summarise the purpose of the various examples and set out briefly the materials treated and solvents and/or diluents used. The results of all these examples are set out in Table VI below:

TABLE VI

| Example No. | Blend of Aid or Experiment % by Weight of Waxy Oil | Filter Time 1 sec | Time 2 secs | Wash Time 1 sec | Time 2 secs | Yields Wet Cake gms | Wax % | Oil % | Total % | RI of Wax at 65° C | Pour Pt. of Oil 20° C |
|---|---|---|---|---|---|---|---|---|---|---|---|
| 13 | Nil | 74 | 174 | 149 | 236 | — | 30.7 | 67.5 | 98.2 | | |
| | Blend A 0.3 | 33 | 92 | 43 | 75 | — | 25.9 | 72.7 | 98.6 | | |
| 14 | Nil | 55 | 180 | 102 | 180 | — | 30.0 | 66.3 | 96.3 | 1.4620 | −14 |
| | Blend A | | | | | | | | | | |

TABLE VI-continued

| Example No. | Blend of Aid or Experiment % by Weight of Waxy Oil | Filter Time 1 sec | Filter Time 2 secs | Wash Time 1 sec | Wash Time 2 secs | Wet Cake gms | Yields Wax % | Yields Oil % | Yields Total % | RI of Wax at 65° C | Pour Pt. of Oil 20° C |
|---|---|---|---|---|---|---|---|---|---|---|---|
|  | 0.3 | 43 | 150 | 48 | 120 | — | 27.4 | 68.8 | 96.2 | 1.4612 | −14 |
|  | Expt. A 0.3 | 63 | 180 | 98 | 180 | — | 31.9 | 64.3 | 96.2 | 1.4624 | −14 |
|  | Expt. B 0.3 | 75 | 180 | 133 | 195 | — | 32.5 | 64.3 | 96.8 | 1.4630 | −14 |
| 15 | Nil | 82 | 330 | 215 | 330 | 396 | 23.8 | 75.2 | 99.0 |  |  |
|  | Blend G 0.2 | 60 | 210 | 140 | 270 | 419 | 23.5 | 75.0 | 98.5 |  |  |
|  | Blend H 0.2 | 47 | 195 | 93 | 180 | 373 | 21.8 | 76.9 | 98.7 |  |  |
|  | Blend A 0.2 | 34 | 120 | 72 | 150 | 337 | 20.7 | 78.1 | 98.8 |  |  |
| 16A | Nil | 55 | 180 | 103 | 180 |  | 30.0 | 66.2 | 96.2 | 1.4620 | −14 |
|  | Blend A 0.3 | 43 | 150 | 48 | 120 |  | 27.4 | 68.8 | 96.2 | 1.4612 | −14 |
|  | Expt. C 0.3 | 65 | 180 | 135 | 180 |  | 30.8 | 67.5 | 98.3 |  |  |
|  | Blend D 0.3 | 45 | 120 | 73 | 120 |  | 30.4 | 67.1 | 97.5 | 1.4618 | −14 |
|  | Blend E 0.3 | 40 | 125 | 65 | 120 |  | 28.0 | 70.3 | 98.3 |  |  |
| 16B | Nil | 50 | 165 | 55 | 135 |  | 29.0 | 69.3 | 98.3 |  |  |
|  | Blend F 0.3 | 45 | 100 | 40 | 80 |  | 27.5 | 71.2 | 98.7 |  |  |
| 17 | Nil | 75 | 180 | 170 | 225 | 443 | 29.5 | 68.0 | 97.5 | 1.4613 |  |
|  | Blend J 0.2 | 37 | 120 | 67 | 135 | 403 | 27.0 | 71.0 | 98.0 | 1.4593 |  |
|  | Blend K 0.2 | 100 | 225 | 220 | 330 | 429 | 29.6 | 68.4 | 98.0 | 1.4613 |  |
| 18 | Nil | 60 | 165 | 150 | 270 | 479 | 38.0 | 55.8 | 93.8≠ | 1.4630 | −15 |
|  | Blend A 0.3 | 20 | 90 | 60 | 135 | 371 | 32.9 | 64.5 | 97.4 | 1.4612 | −15 |
|  | Blend A 0.2 | 20 | 105 | 55 | 105 | 378 | 34.8 | 62.0 | 96.8 | 1.4610 |  |
|  | Blend A 0.1 | 25 | 105 | 45 | 120 | 398 | 34.5 | 63.1 | 97.6 | 1.4614 | −15 |
|  | Blend A 0.05 | 45 | 135 | 105 | 165 | 401 | 38.2 | 56.0 | 94.2≠ | 1.4630 |  |
| 19 | Nil | 40 | 80 | 60 | 90 |  | 26.0 | 71.0 | 97.0 |  |  |
|  | Blend L 0.5 | 30/40 | 60/65 | 30/35 | 45 |  | 20.0 | 79.0 | 99.0 |  |  |
|  | Blend L 0.25 | 25/30 | 45 | 50 | 50 |  | 18.0 | 78.0 | 96.0 * |  |  |
|  | Blend L 0.19 | 25 | 50 | 25/30 | 40/45 |  | 19.5 | 76.5 | 96.0 |  |  |
|  | Blend L 0.19 | 23 | 48 | 23 | 35 |  | 19.5 | 78.5 | 98.0 |  |  |
|  | Blend L 0.125 | 18 | 40 | 20 | 30/35 |  | 21.0 | 75.0 | 96.0 |  |  |
|  | Blend M 0.19 | 30 | 50/55 | 40 | 55/60 |  | 23.5 | 72.0 | 95.5 |  |  |
|  | Blend N 0.19 | 30/35 | 50/55 | 45/50 | 75 |  | 23.8 | 73.0 | 96.8 |  |  |
| 20 | Nil | 60 | 120 | 60 | 120 |  | 56.3 | 39.8 | 96.1 |  | −17 |
|  | Blend L 0.19 | 20 | 50 | 80 | 100 |  | 43.8 | 51.8 | 95.6 |  | −14 |
|  | Blend P 0.29 | 20 | 60 | 120 | 165 |  | 43.3 | 52.5 | 95.8 |  | −18 |
|  | Blend R 0.29 | 15 | 45 | 135 | 165 |  | 47.5 | 47.8 | 95.3 |  | −16 * |
|  | Blend A 0.29 | 10 | 40 | 15 | 50 |  | 41.8 | 53.0 | 94.8 |  | −18 |
|  | Blend A 0.29 | 10 | 45 | 15 | 60 |  | 40.8 | 52.3 | 93.1 |  | −19 |
|  | Blend S 0.39 | 10 | 55 | 30 | 60 |  | 37.5 | 55.5 | 93.0 |  | −18 * |
|  | Blend S 0.39 | 10 | 55 | 20 | 75 |  | 40.3 | 53.0 | 93.3 |  | −17 |

*Duplicates.
[16]Recoveries of oil and wax low, mainly due to "sloppy" nature of wax fraction.

Example 13 compares the use of a preferred de-waxing blend with a blank using, in the trial, a nominal 600 SUS viscosity at 100° F oil with a de-waxing temperature of −16° C. The solvent used was a 40%/60% mek/mibk mixture using 2 parts of solvent to 1 part by weight of oil and using as a wash liquor 1 part of solvent.

Example 14 demonstrates the use of a preferred blend with other de-waxing compositions and shows the criticality of the requirement of a polymerised polyol ester being present. The work was carried out on the same oil as in Example 13 and using the solvent and wash systems of Example 1.

Example 15 demonstrates the effect of increasing the degree of polymerisation of glycerol on one component of the blend. The oil used in the trial was a nominal 450 SUS viscosity oil at 100° F. The de-waxing temperature was −16° C and the solvent used was 3 parts of a 50/50 mek/toluene mixture to 1 part of oil and the wash was 1 part of 50/50 mek/toluene mixture.

Examples 16A and 16B demonstrate the use of polyols other than glycerol, in ester formation. The oil was that used in Example 13 and the solvent wash regime as in Example 1.

Example 17 demonstrates the effect of the change in the fatty acid composition of Ester 1 in the de-waxing blend. The oil used was the same as that used in Example 13 and the solvent and wash regime as in Example 1.

Example 18 demonstrates the effect of de-waxing blend concentration on the de-waxing process. Again, the oil of Example 13 and the solvent wash regime of Example 1 were employed.

Example 19 demonstrates the effect of varying the addition level of the de-waxing blend and varying the ratio of components in the blend. The oil used in the trial was a nominal 150 SUS at 100° F oil. The de-waxing temperature was −6° C so that a blend of Esters 1 and 2 could be used and the solvent employed was mek at a 1:1 ratio for solution and wash with oil.

Example 20 illustrates the need for the lower carbon chain esters, when de-waxing at lower temperatures. The oil used in the trial was a nominal 150 SUS at 100° F oil. The de-waxing temperature was −18° C.

EXAMPLE 21

In a short refinery trial, Blend A was added at a level of 0.24% by weight of the waxy oil and compared with a control in which no de-waxing aid was used. The feedstock used in both trials was a solvent extracted vacuum distillate ex Middle East crude oil. The feedstock viscosity was 11.33 centistokes at 210° F. It was found that by use of the Blend A an approximate 50% increase in filtration rate was achieved and the de-waxed oil yield was increased by 1 to 2%. The de-waxed oil from each trial had a pour point of 15° F and a viscosity index of 95.

We claim:

1. A process for the separation of wax from mineral oil, comprising the steps of forming a solution of an effective amount of a blend of polymerized polyol esters in a waxy mineral oil, and subsequently cooling the solution to a crystallization temperature to separate out wax and at least some of the ester from the solution, in which process:
   (a) the amount of polymerized polyol ester is sufficient to modify the crystal structure of the separated wax and
   (b) the polyol esters are of $C_8$ to $C_{24}$ fatty acids containing at least 5 esterified hydroxyl groups per molecule.

2. A process as claimed in claim 1 in which the addition level of the polymerized polyol ester is of at least 0.05% by weight of the waxy oil.

3. A process as claimed in claim 1, in which the polymerized polyol is polyglycerol or polypentaerythritol.

4. A process as claimed in claim 1 in which the polymerized polyol has from 6 to 20 OH groups.

5. A process as claimed in claim 1 in which the polymerized polyol is a polyglycerol containing 8 to 14 glycerol residues.

6. A process as claimed in claim 1 in which the blend comprises at least 20% by weight of a $C_{20}$ to $C_{24}$ fatty ester.

7. A process as claimed in claim 1 in which the weight percentage of polyol esters derived from $C_{20}$ to $C_{24}$ acids to esters derived from $C_8$ to $C_{18}$ acids is in the range 20–80%80–20%.

8. A process as claimed in claim 1 in which the polyol ester composition comprises esters derived from 3 ranges of fatty acids present in weight percentage ranges $C_{8-14}$:$C_{16-18}$: $C_{20-24}$ 0–50:20–80:80–20.

9. A process as claimed in claim 1 wherein the solution additionally contains a solvent or diluent.

* * * * *

UNITED STATES PATENT OFFICE
CERTIFICATE OF CORRECTION

Patent No. 4,105,539          Dated Aug. 8, 1978

Inventor(s) Hans Borst et al

It is certified that error appears in the above-identified patent and that said Letters Patent are hereby corrected as shown below:

IN THE CLAIMS:

In Claim 7, line 4, "20-80% 80-20%"

should read --20-80%:80-20%--.

Signed and Sealed this

Twentieth Day of March 1979

[SEAL]

Attest:

RUTH C. MASON
Attesting Officer

DONALD W. BANNER
Commissioner of Patents and Trademarks